(12) United States Patent
Kim et al.

(10) Patent No.: US 6,921,792 B2
(45) Date of Patent: Jul. 26, 2005

(54) CHEMICALLY MODIFIED POLYOLEFIN ELASTOMER COMPOSITION AND METHOD FOR PREPARING THE SAME

(75) Inventors: Sang Bae Kim, Yeosu (KR); Sung Su Na, Yeosu (KR); Yeon Won Jeyong, Yeosu (KR)

(73) Assignee: Kumho Polychem Co., Ltd., Seoul (KR)

(*) Notice: Subject to any disclaimer, the term of this patent is extended or adjusted under 35 U.S.C. 154(b) by 11 days.

(21) Appl. No.: 10/073,070

(22) Filed: Feb. 7, 2002

(65) Prior Publication Data

US 2003/0073783 A1 Apr. 17, 2003

(30) Foreign Application Priority Data

Oct. 12, 2001 (KR) ........................................ 2001-62795

(51) Int. Cl.[7] ............................................... C08L 51/04
(52) U.S. Cl. ...................... 525/236; 525/240; 525/242; 525/262; 525/285; 525/64; 525/69; 525/191; 525/193; 524/504
(58) Field of Search ................................ 525/236, 240, 525/242, 262, 285, 64, 69, 191, 193; 524/504

(56) References Cited

U.S. PATENT DOCUMENTS

| | | | |
|---|---|---|---|
| 3,236,917 A | 2/1966 | Natta et al. | |
| 3,972,961 A | 8/1976 | Hammer et al. | |
| 4,340,689 A | 7/1982 | Joffrion | |
| 4,594,386 A * | 6/1986 | Olivier | 525/66 |
| 4,661,554 A | 4/1987 | Coran et al. | |
| 4,670,515 A | 6/1987 | Olivier | |
| 4,762,890 A | 8/1988 | Strait et al. | |
| 5,194,509 A | 3/1993 | Hasenbein et al. | |
| 5,229,456 A * | 7/1993 | Ilenda et al. | 525/66 |
| 5,843,577 A * | 12/1998 | Ouhadi et al. | 428/474.7 |
| 6,303,688 B1 * | 10/2001 | Schauder | 525/63 |
| 6,383,439 B1 * | 5/2002 | Schauder | 525/65 |

FOREIGN PATENT DOCUMENTS

WO    WO 98/07769    2/1998

* cited by examiner

Primary Examiner—James J. Seidleck
Assistant Examiner—Olga Asinovsky
(74) Attorney, Agent, or Firm—Knobbe Martens Olson & Bear

(57) ABSTRACT

Disclosed are a chemically modified polyolefin elastomer composition that is highly compatible with thermoplastics and useful in improving the low temperature impact strength of thermoplastics, and a method for preparing the chemically modified polyolefin elastomer composition. The elastomer composition includes a polyolefin resin and a chemically modified ethylene-α-olefin elastomer mixed with the polyolefin resin. The chemically modified ethylene-α-olefin elastomer includes an ethylene-α-olefin elastomer backbone and grafted branches from the backbone. The branches includes polymers of one or more monomers comprising an unsaturated organic compound containing at least one carbonyl group. The method of producing the composition includes mixing an ethylene-α-olefin elastomer and a polyolefin resin to provide a mixture thereof, to which added is one or more monomers having an unsaturated organic compound containing at least one carbonyl group. Then the one or more monomers are polymerized in the presence of a grafting initiator.

39 Claims, 1 Drawing Sheet

CHEMICALLY MODIFIED POLYOLEFIN ELASTOMER COMPOSITION AND METHOD FOR PREPARING THE SAME

BACKGROUND OF THE INVENTION

1. Field of the Invention

The present invention relates to an elastomer composition for use in improving impact strength of plastic materials. More particularly, the present invention relates to an elastomer composition comprising chemically modified ethylene-α-olefin elastomer, a method of producing the composition and a method of improving impact strength of plastic materials.

2. Description of the Prior Art

EP(D)M rubber, a kind of ethylene-α-olefin elastomer copolymers, has been extensively used to improve the impact strength of polyolefin products, especially, low-temperature impact strength by taking advantage of its high compatibility with polyolefin resins.

On the other hand, EP(D)M rubber is poor in its compatibility with a polar plastics because of its non-polar characteristics, so its application range is limited. For example, EP(D)M cannot be sufficiently blended with such general-purpose engineering plastics as nylon, ABS (acrylonitrile butadiene styrene), polycarbonate, etc. To expand its applicability to such polar engineering plastics, EP(D)M rubber is made polar through provision with polar groups with the use of, for example, maleic acid. Typically, EP(D)M is made compatible with thermoplastics such as polyamides by being grafted with carbonyl derivatives.

Recently, the automobile industry has paid special attention to thermoplastics, especially polyamides, as substitutes for metallic parts for automobiles. For use in automobile parts, thermoplastics are formed into high molecular weight thermoplastic elastomers by injection molding. On the whole, the applicability of thermoplastics is limited by processing methods. Being low in melt strength, polyamide, for example, frequently undergoes parison tearing that leads to failures in blow molding.

There is required a thermoplastic modifier that is easily dispersed without increasing the viscosity of the blend. Because they are easily dispersed in thermoplastic elastomers, high molecular weight modifiers may be used to increase the melt strength of elastomers. In addition, high molecular weight modifiers do not increase the viscosity of the blend or limit the period time of the blow-molding phase. Therefore, there remains a need for EP(D)M rubber, which is modifier to blend the thermoplastics without reducing the melt viscosity of the final EP(D)M/thermoplastic blend. Modified with typical modifiers, the EP(D)M rubber is improved in its compatibility with plastics and thus can be used as an impact reinforcement to increase the impact strength of the plastics at room temperature as well as at low temperatures.

Conventionally, EP(D)M rubber has its appearance limited to pellets in order to be modified within extruders. The pelletization of EP(D)M requires that it contain an ethylene content of 70 wt % or more. However, higher ethylene contents bring about lesser improvements in impact strength. Particularly, the EP(D)M rubber with high ethylene contents cannot act as modifiers, resulting in a drastic decreases in low temperature impact strength.

SUMMARY OF THE INVENTION

One aspect of the present invention provides a method of producing a polymer composition. The method comprises mixing an ethylene-α-olefin elastomer and a polyolefin resin to provide a mixture thereof; adding to the mixture one or more monomers comprising an unsaturated organic compound containing at least one carbonyl group; and polymerizing one or more monomers in the presence of a grafting initiator, whereby polymers of the one or more monomers graft from a backbone of the ethylene-α-olefin elastomer. The method further comprises pelletizing the mixture, wherein the one or more monomers are added to the pelletized mixture. The polymerization is performed while blending the one or more monomers with the mixture in a twin-screw extruder. The initiator comprises dialkyl peroxide. The initiator is added in an amount of from about 0.01 to about 1.0 wt % of the total weight of the polymer composition. The method further comprises pelletizing the resultant of the polymerization. The mixing is performed at a temperature from about 150 to about 250° C., preferably at about 180 to about 200° C. The method further comprises adding a processing oil to the mixture. The processing oil is added in an amount of about 2 wt % or less of the total weight of the polymer composition. The processing oil has an aromatic carbon content of about 0.5 wt % or less. The ethylene-c-olefin elastomer is selected from the group consisting of ethylene-propylene rubber, ethylene-butene rubber, ethylene-octene rubber, ethylene-propylene-diene rubber, ethylene-butene-diene rubber, ethylene-octene-diene rubber, and mixtures thereof. The ethylene-propylene-diene rubber, ethylene-butene-diene rubber, and ethylene-octene-diene rubber comprises a diene element made of a diene compound selected from the group consisting of 5-ethylidene-2-norbornene, dicyclohexadiene, and 1,4 hexadiene. The ethylene-α-olefin elastomer has an ethylene content of from about 30 wt % to about 75 wt %; preferably from about 40 wt % to about 70 wt %; more preferably from about 50 wt % to about 60 wt %. The ethylene-α-olefin elastomer is in an amount of from about 40 wt % to about 95 wt % of the total weight of the polymer composition. The polyolefin resin is selected from the group consisting of high density polyethylene, low density polyethylene, linear low density polyethylene, very low density polyethylene, homo polypropylene, block polypropylene, random polypropylene and mixtures thereof. The polyolefin resin has a fluidity of from about 0.5 to about 60 (g/10 min). The one or more monomers are selected from the group consisting of carboxylic acid, maleic anhydride, and salts of esters. The one or more monomers are in an amount from about 0.2 to about 10 wt % of the total weight of the polymer composition, preferably, from about 0.5 to about 7 wt %, more preferably from about 1 to about 3 wt % of the total weight of the polymer composition.

Another aspect of the present invention provides a polymer composition produced by the above-discussed method.

Still another aspect of the present invention provides a polymer composition, which comprises a polyolefin resin; a chemically modified ethylene-α-olefin elastomer mixed with the polyolefin resin; and wherein the chemically modified ethylene-α-olefin elastomer comprises an ethylene-α-olefin elastomer backbone and grafted branches from the backbone, and wherein the branches comprises polymers of one or more monomers comprising an unsaturated organic compound containing at least one carbonyl group. In the polymer composition at least part of the polyolefin resin is in a chemically modified form with grafted branches, and wherein the grafted branches of the polyolefin resin comprises polymers of one or more monomers comprising an unsaturated organic compound containing at least one carbonyl group. The polymer composition is in the form of pellets. The polymer composition further comprises a processing oil mixed therewith. The processing oil is in an amount of about 2 wt % or less of the total weight of the polymer composition. The processing oil has an aromatic carbon content of about 0.5 wt % or less. The ethylene-α-olefin elastomer is selected from the group consisting of ethylene-propylene rubber, ethylene-butene rubber, ethylene-octene rubber, ethylene-propylene-diene rubber, ethylene-butene-diene rubber, ethylene-octene-diene rubber, and mixtures thereof. The ethylene-α-olefin elastomer has an ethylene content of from about 30 wt % to about 75 wt %, preferably from about 40 wt % to about 70 wt %, more preferably from about 50 wt % to about 60 wt %. The ethylene-α-olefin elastomer is in an amount of from about 40 wt % to about 95 wt % of the total weight of the polymer composition. The polyolefin resin is selected from the group consisting of high density polyethylene, low density polyethylene, linear low density polyethylene, very low density polyethylene, homo polypropylene, block polypropylene, random polypropylene and mixtures thereof. The one or more monomers are selected from the group consisting of carboxylic acid, maleic anhydride, and salts of esters. The grafted polymers of one or more monomers are in an amount from about 0.2 to about 10 wt % of the total weight of the polymer composition, preferably from about 0.5 to about 7 wt %, more preferably from about 1 to about 3 wt % of the total weight of the polymer composition.

A still further aspect of the present invention provides a method of improving impact strength of a plastic material. The method comprises providing the above-discussed polymer composition; and blending the polymer composition with a plastic material selected from the group consisting of nylons, acrylonitrile butadiene styrene (ABS) resins, polycarbonate, polyisobutylene, polybutene, polyvinylchloride (PVC), ethylene acrylate copolymer, high density polyethylene, low density polyethylene, linear low density polyethylene, very low density polyethylene, homo polypropylene, block polypropylene, random polypropylene and mixtures thereof. The polymer composition provided is in the form of pellets. The nylons comprise nylon 6 and nylon 66.

DETAILED DESCRIPTION OF THE INVENTION

Figure 1:
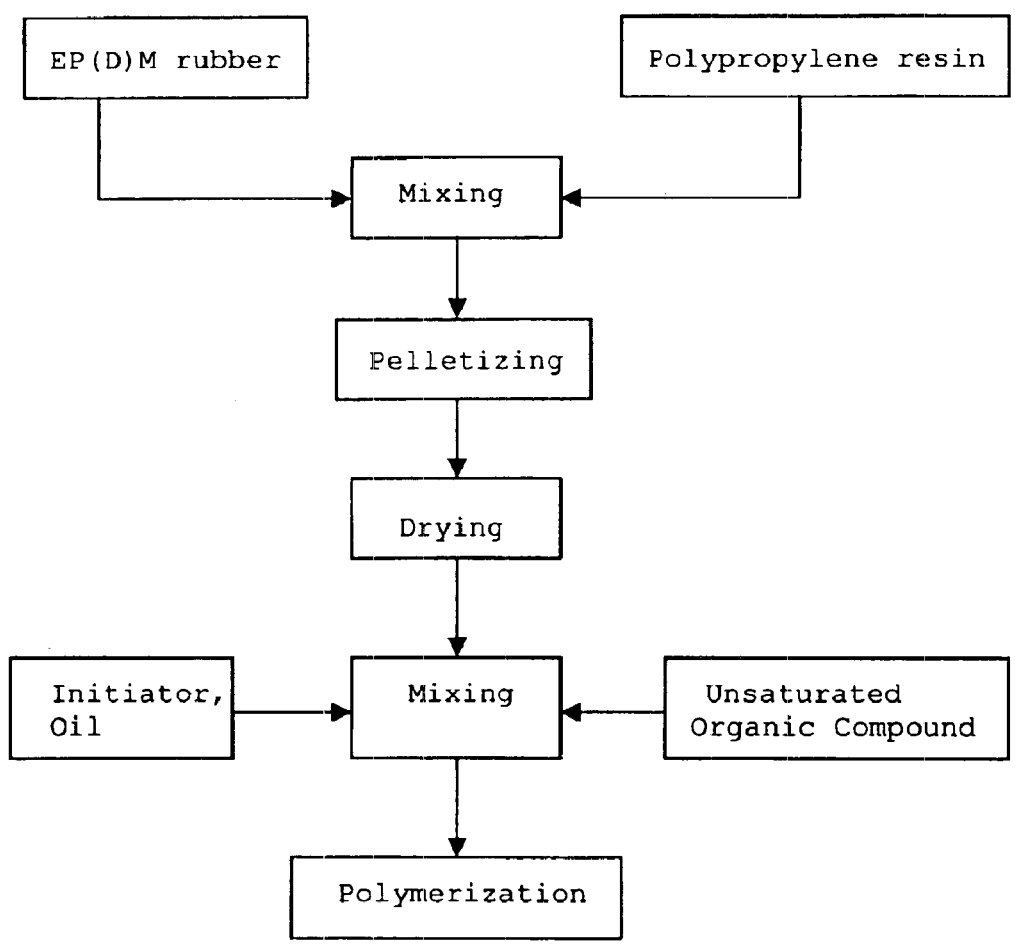
FIG. 1 is a process diagram showing the preparation of the chemically modified polypropylene elastomer composition of the present invention.

The present invention is directed to a chemically modified polyolefin elastomer composition in which EP(D)M rubber grafted with unsaturated organic compounds containing at least one carbonyl group is blended with polypropylene. Conventionally, thermoplastics are grafted with only EP(D)M rubber. However, the conventional thermoplastic resins which are grafted only with EP(D)M rubber cannot satisfy the blending purpose because they suffer from the disadvantage of being low in low temperature impact strength. In order to avoid this disadvantage, the EP(D)M rubber is required to have low ethylene contents. However, it is difficult to process the EP(D)M rubber, along with thermoplastics, because blocking phenomena occur therein. In the present invention, polypropylene is introduced into the graft to prevent the occurrence of the blocking phenomena and to improve the low temperature impact strength of the blend. In addition, the introduction of polypropylene forms a ternary phase blend consisting of EPDM rubber, polypropylene and a thermoplastic, thereby bringing about an improvement in the compatibility of EP(D)M with thermoplastics and thus in the mechanical properties of the final product, including tensile strength, impact strength and modulus. The thermoplastics useful in the present invention are exemplified by high density polyethylene, low density polyethylene, linear low density polyethylene, very low density polyethylene, polypropylene, polyisobutylene, polybutene, PVC, ethylene acrylate copolymer, and ethylene methyl acrylate copolymer. Particularly, resins for engineering plastics, such as polyamide, polybutylene terephthlate, polyethylene terephthalate, polycarbonate and polyacetal, are used.

The present invention pertains to an ethylene-α-olefin elastomer composition in which a blend of the EP(D)M rubber having an ethylene content of 75% or less and polypropylene is grafted with 0.01 wt % or higher of unsaturated organic compounds containing at least one carbonyl group.

The EP(D)M used in the present invention may or may not contain a diene, for example, 5-ethylidene-2-norbornene as a third monomer. Without a diene, it is composed only of ethylene and propylene (VISTALON 606, Kumho Polychem Ltd., Korea), taking an EPM structure. Ethylene is contained in the amount of 30 to 75% based on the total weight of the EP(D)M and preferably in the amount of 45 to 60%. Ranging in MLRA from 80 to 300, the EP(D)M of the present invention has a Mooney viscosity of 50 to 80 at ML 1+4 125° C. and preferably a Mooney viscosity of 60 to 70.

Polypropylene allows the EP(D)M to be pelletized and compatible with thermoplastic resins (e.g., engineering plastics), forming a three-phase blend. Useful are homo polypropylene, block polypropylene and random polypropylene. Particularly, block polypropylene shows desired physical properties when containing ethylene in the amount of 3% or higher and preferably in the amount of 5% or higher. In addition, affecting the physical properties of the final product, the fluidity of the block polypropylene is on the order of 1 to 30 (230 C/2.16 kg) and preferably on the order of 2 to 20.

In accordance with the present invention, the EP(D)M rubber is grafted with unsaturated organic compounds containing at least one carbonyl group. In the present invention, the grafting of the EP(D)M rubber is achieved by reaction with the unsaturated organic compound in the presence of a selective free radical initiator. Therefore, the term "grafted polymer" as used herein means a product resulting from the reaction between the unsaturated organic compound and EP(D)M. For the grafting, the EP(D)M rubber, the unsaturated organic compounds, and the selective radical initiator are all introduced into a reaction region and mixed therein. The EP(D)M can be grafted by various methods, using extruders or internal mixers. In the present invention, EP(D)M with low ethylene content is blended with polypropylene and pelletized using an internal mixer and the pellet is heated to the melting using a twin-screw extruder. After the introduction of an unsaturated organic compound and a free radical initiator into the mixer, the components are mixed under high or low shearing conditions. The unsaturated organic compounds take part in grafting with pure EP(D)M rubber or a portion of the polypropylene.

Examples of typical free radical initiators include dialkylperoxide, hexane, diacylperoxide (dibenzoylperoxide, dilaurylperoxide), peroxyester (tert-butyl peroxyacetate), azobisisobutyronitrile (AIBN) peroxyketone. In the present invention, Luperox 130 XL45 (product from Atofina) was used.

The term "unsaturated organic compound containing at least one carbonyl group" as used herein means a compound containing at least one unsaturated group and at least one carbonyl group (—C=O), such as carboxylic acid, anhydride, ester, and their salts with metal or nonmetal. Preferable are unsaturated ethylenes conjugated with carbonyl groups. Examples of the unsaturated organic compound containing at least one carbonyl group useful in the present invention include maleic acid, fumaric acid, acrylic acid, methacrylic acid, itaconic acid, crotonic acid, alpha-methylcrotonic acid, cinammic acid, and their anhydrides, esters, and salt derivatives; and glycidylmethacrylate, glycidylacrylate and other glycidyl compounds with preference for maleic anhydride.

When mixing pellets made of EP(D)M rubber and polypropylene, along with the unsaturated organic compound containing at least one carbonyl compound and the free radical initiator, an oil is added to improve the processability and finally to improve the compatibility of the composition of the present invention with engineering plastics. The oil shows low fluidity under a low shearing force and high fluidity under a high shearing force, thereby improving the processability and productivity of the final product molded from a blend comprising the composition of the present invention and an engineering plastic. As expected, the oil functions to make the surface of the final product smooth. Useful in the present invention is an oil which comprises a paraffinic carbon component in an amount of 60 to 75 wt % with an aromatic carbon content of 1 wt % or less. Preferred is an oil having a paraffinic carbon content of 64 to 70 wt %. The oil is used in an amount of 5% or less and more preferably in an amount of 2 wt % without causing a change in the thermal resistance of the final product.

Turning to a method for preparing such a polyolefin elastomer composition, it can be broken down into two steps. In step 1, EP(D)M rubber and polypropylene is mixed and the mixture is pelletized. In this regard, an internal mixer such as a Banbury mixer or a kneader mixer may be used. EP(D)M rubber and polypropylene are charged into the mixer whose inside is maintained at 180 to 200° C., and mixed together, after which the mixture is pelletized through a single-screw extruder. The EP(D)M is used in an amount of 60 to 90 wt % based on the total weight of the mixture and preferably in an amount of 70 to 80 wt %. After being completely dried, the pelletized mixture is subjected to step 2. In step 2, the pellets are blended with an unsaturated organic compound containing at least one carbonyl group in the presence of a free radical initiator and an oil for 5 min with the aid of a tumbler mixer, followed by polymerization through a twin-screw extruder. The unsaturated organic compound containing at least one carbonyl group is used in an amount of 7 wt % or less based on the total weight of the composition. As for the free radical initiator, its amount does not exceed 2 wt % and preferably 0.8 wt %. In order to provide as long a polymerization time as possible, the twin-screw extruder has an L/D of 24 or more and preferably 32 or more. It is desired that the extruder is mounted with vacuum pumps at its middle and end positions to ventilate offensive odors as much as possible.

A better understanding of the present invention may be obtained in light of the following examples which are set forth to illustrate, but are not to be construed to limit the present invention.

EXAMPLE 1

To investigate characteristics of EP(D)M rubber, modified EP(D)M rubber was prepared through an extruder, using the rubber shown in Table 1, below.

TABLE 1

|  | EPDM 1 | EPDM 2 | EPDM 3 | EPDM 4 |
| --- | --- | --- | --- | --- |
| ML(1 + 4) 125C. | 25 | 69 | 53 | 65 |
| Ethylene Content (%) | 70 | 69 | 68 | 50 |
| ENB Content (%) | 0 | 0 | 4.5 | 0 |
| MLRA | 21 | 180 | 150 | 165 |

EPDM 1, EPDM 2 and EPDM 3, which all were in pellet forms, could be processed in an extruder while EPDM 4 existing in a bale form was processed in a Banbury mixer. The graft ratios of the EPDMs are given in Table 2, below.

TABLE 2

|  | Test-1 | Test-2 | Test-3 | Test-4 |
| --- | --- | --- | --- | --- |
| Rubber | EPDM 1 | EPDM 2 | EPDM 3 | EPDM 4 |
| Added Peroxide (wt %) | 0.15 | 0.15 | 0.15 | 0.15 |
| Added MA (wt %) | 3 | 3 | 3 | 3 |
| MA (wt %) | 0.48 | 0.55 | 0.82 | 0.89 |
| Graft Ratio (%) | 23 | 27 | 40 | 43 |

EPDM was processed while the external temperature of the Banbury mixer was maintained at 160° C. After the rubber was completely melted, a peroxide was provided, followed by the addition of maleic acid to graft the rubber with the organic compound. The graft ratios of the EPDMs given in Table 2 were determined by Fourier transform-infrared spectroscopy. In this regard, MA contents were measured by calculating the relative peak height at 1790 cm$^{-1}$ for anhydride absorption bond based on the peak at 1712 cm$^{-1}$ for acid absorption (resulting from the hydrolysis of anhydride by the moisture of the air).

EXAMPLE 2

To pelletize EPDM 4, which is low in ethylene content, polypropylene (Model JI-360, Honam Petrochemical Corp., Korea) was mixed with the rubber. To this end, the processing of the rubber was conducted in a Banbury mixer and a continuous twin-screw extruder while maintaining the graft ratio at levels similar to those in the absence of polypropylene.

TABLE 3

|  | Test-5 | Test-6 | Test-7 | Test-8 |
| --- | --- | --- | --- | --- |
| EPDM 4 (wt %) | 90 | 80 | 70 | 60 |
| Polypropylene (wt %) | 10 | 20 | 30 | 40 |
| MA Content | 3 | 3 | 3 | 3 |
| Peroxide Content | 0.15 | 0.15 | 0.15 | 0.15 |
| MA (wt %) | 0.92 | 0.96 | 0.99 | 1.09 |
| Graft Ratio (%) | 45 | 47 | 48 | 53 |

EXAMPLE 3

The modified EP(D)M rubber prepared according to the method of Example 2 was blended with nylon. 1021 ST, which is produced by Rhodia Amide, Korea, was used as a nylon plastic. For the blending of the modified rubber with the nylon, there was used a twin-screw extruder which was 25 mm in diameter and 26 in L/D with the two screws rotating in the same direction. The blending was conducted at 150 rpm under temperature conditions of 210, 230, 250, 260, 260, 260, 260, 260 and 250° C. The resulting products were measured for low temperature impact strength and the results are given in Table 4, below. As shown in Table 4, better low temperature impact strength was obtained at lower ethylene contents.

TABLE 4

|  | Test 9 | Test 10 | Test 11 | Test 12 |
|---|---|---|---|---|
| Modified Rubber | 20 (Test-1) | 20 (Test-2) | 20 (Test-3) | 20 (Test-4) |
| Nylon Content (%) | 80 | 80 | 80 | 80 |
| Impact Strength at 25° C. (kg.f/cm$^2$) | N.B | N.B | N.B | N.B |
| Low-Temp. Impact Strength at −30° C. (kg.f/cm$^2$) | 60 | 65 | 70 | 92 |
| Tensile Strength (kg.f/cm$^2$) | 520 | 500 | 410 | 550 |
| Elongation (%) | 310 | 320 | 270 | 360 |

As described, the chemically modified polyolefin elastomer composition of the present invention can be blended with polar engineering plastics by virtue of the high compatibility, thereby increasing the low temperature impact strength of the engineering plastics. In addition, when blended with the composition of the present invention, engineering plastics can be improved in adhesion, paintability and fusion properties.

What is claimed is:

1. A method of producing a polymer composition, comprising:
   mixing an ethylene-α-olefin elastomer and a polyolefin resin to provide a mixture thereof, wherein said ethylene-α-olefin elastomer has an ethylene content of from about 30 wt % to about 75 wt % without diene components;
   pelletizing the mixture;
   drying the pelletized mixture;
   adding to the mixture one or more monomers comprising an unsaturated organic compound containing at least one carbonyl group, and a processing oil; and
   polymerizing one or more monomers in the presence of a grafting initiator, wherein polymers of the one or more monomers graft from a backbone of the ethylene-α-olefn elastomer.

2. The method of claim 1, wherein the polymerization is performed while blending the one or more monomers with the mixture.

3. The method of claim 1, wherein the polymerization is performed in a twin-screw extruder.

4. The method of claim 1, wherein the initiator comprises dialkyl peroxide.

5. The method of claim 4, wherein the initiator is added in an amount of from about 0.01 to about 1.0 wt % of the total weight of the polymer composition.

6. The method of claim 1, further comprising pelletizing the resultant of the polymerization.

7. The method of claim 1, wherein the mixing is performed at a temperature from about 150 to about 250° C.

8. The method of claim 1, wherein the mixing is performed at a temperature from about 180 to about 200° C.

9. The method of claim 1, wherein the processing oil is added in an amount of about 2 wt % or less of the total weight of the polymer composition.

10. The method of claim 1, wherein the processing oil has an aromatic carbon content of about 0.5 wt % or less.

11. The method of claim 1, wherein the ethylene-α-olefin elastomer is selected from the group consisting of ethylene-propylene rubber, ethylene-butene rubber, ethylene-octene rubber, and mixtures thereof.

12. The method of claim 1, wherein the ethylene-α-olefin elastomer has an ethylene content of from about 40 wt % to about 70 wt %.

13. The method of claim 1, wherein the ethylene-α-olefin elastomer has an ethylene content of from about 50 wt % to about 60 wt %.

14. The method of claim 1, wherein the ethylene-α-olefin elastomer is in an amount of from about 40 wt % to about 95 wt % of the total weight of the polymer composition.

15. The method of claim 1, wherein the polyolefin resin is selected from the group consisting of high density polyethylene, low density polyethylene, linear low density polyethylene, very low density polyethylene, homo polypropylene, block polypropylene, random polypropylene and mixtures thereof.

16. The method of claim 1, wherein the polyolefin resin has a fluidity of from about 0.5 to about 60 (g/10 min).

17. The method of claim 1, wherein the one or more monomers are selected from the group consisting of carboxylic acid, maleic anhydride, and salts of esters.

18. The method of claim 1, wherein the one or more monomers are in an amount from about 0.2 to about 10 wt % of the total weight of the polymer composition.

19. The method of claim 1, wherein the one or more monomers are in an amount from about 0.5 to about 7 wt % of the total weight of the polymer composition.

20. The method of claim 1, wherein the one or more monomers are in an amount from about 1 to about 3 wt % of the total weight of the polymer composition.

21. A polymer composition produced by the method of claim 1.

22. A polymer composition, comprising:
   a polyolefin resin;
   a chemically modified ethylene-α-olefin elastomer mixed with the polyolefin resin, wherein the ethylene-α-olefin elastomer has an ethylene content of from about 30 wt % to about 75 wt % without diene components;
   a processing oil; and
   wherein the chemically modified ethylene-α-olefin elastomer comprises an ethylene-α-olefin backbone and grafted branches from the backbone, wherein the branches comprise polymers of one or more monomers comprising an unsaturated organic compound containing at least one carbonyl group.

23. The polymer composition of claim 22, wherein at least part of the polyolefin resin is in a chemically modified form with grafted branches, and wherein the grafted branches of the polyolefin resin comprises polymers of one or more monomers comprising an unsaturated organic compound containing at least one carbonyl group.

24. The polymer composition of claim 22, wherein the processing oil is in an amount of about 2 wt % or less of the total weight of the polymer composition.

25. The polymer composition of claim 22, wherein th processing oil has an aromatic carbon content of about 0.5 wt % or less.

26. The polymer composition of claim 22, wherein the ethylene-α-olefin elastomer is selected from the group consisting of ethylene-propylene rubber, ethylene-butene rubber, ethylene-octene rubber, and mixtures thereof.

27. The polymer composition of claim 22, wherein the ethylene-α-olefin elastomer has an ethylene content of from about 40 wt % to about 70 wt %.

28. The polymer composition of claim 22, wherein the ethylene-α-olefin elastomer has an ethylene content of from about 50 wt % to about 60 wt %.

29. The polymer composition of claim 22, wherein the ethylene-α-olefin elastomer is in an amount of from about 40 wt % to about 95 wt % of the total weight of the polymer composition.

30. The polymer composition of claim 22, wherein the polyolefin resin is selected from the group consisting of high density polyethylene, low density polyethylene, linear low density polyethylene, very low density polyethylene, homo polypropylene, block polypropylene, random polypropylene and mixtures thereof.

31. The polymer composition of claim 22, wherein the one or more monomers are selected from the group consisting of carboxylic acid, maleic anhydride, and salts of esters.

32. The polymer composition of claim 22, wherein the grafted polymers of one or more monomers are in an amount from about 0.2 to about 10 wt % of the total weight of the polymer composition.

33. The polymer composition of claim 22, wherein the grafted polymers of one or more monomers are in an amount from about 0.5 to about 7 wt % of the total weight of the polymer composition.

34. The polymer composition of claim 22, wherein the grafted polymers of one or more monomers are in an amount from about 1 to about 3 wt % of the total weight of the polymer composition.

35. A method of improving impact strength of a plastic material, comprising:

providing the polymer composition of claim 22; and blending the polymer composition with a plastic material selected from the group consisting of nylons, acrylonitrile butadiene styrene (ABS) resins, polycarbonate, polyisobutylene, polybutene, polyvinylchloride (PVC), ethylene acrylate copolymer, high density polyethylene, low density polyethylene, linear low density polyethylene, very low density polyethylene, homo polypropylene, block polypropylene, random polypropylene and mixtures thereof.

36. The method of claim 35, wherein the polymer composition provided is in the form of pellets.

37. The method of claim 35, wherein the nylons comprise nylon 6 and nylon 66.

38. The method of claim 1 wherein the ethylene-α-olefin is composed of ethylene and propylene.

39. The polymer composition of claim 22, wherein the ethylene-α-olefin is composed of ethylene and propylene.

* * * * *